(12) United States Patent
Ghazarian

(10) Patent No.: US 10,173,185 B2
(45) Date of Patent: Jan. 8, 2019

(54) GRILL COOKING DEVICE

(71) Applicant: Vahan Ghazarian, Sunland, CA (US)

(72) Inventor: Vahan Ghazarian, Sunland, CA (US)

(73) Assignee: DABBLE VENTURES, LLC, Sunland, CA (US)

( * ) Notice: Subject to any disclaimer, the term of this patent is extended or adjusted under 35 U.S.C. 154(b) by 0 days.

(21) Appl. No.: 15/587,340

(22) Filed: May 4, 2017

(65) Prior Publication Data

US 2017/0348654 A1    Dec. 7, 2017

Related U.S. Application Data

(60) Provisional application No. 62/344,202, filed on Jun. 1, 2016.

(51) Int. Cl.
| *B01F 11/00* | (2006.01) |
| *A47J 37/07* | (2006.01) |
| *B01F 15/00* | (2006.01) |
| *B06B 1/16* | (2006.01) |

(52) U.S. Cl.
CPC ....... *B01F 11/0097* (2013.01); *A47J 37/0786* (2013.01); *B01F 15/00181* (2013.01); *B01F 15/00207* (2013.01); *B01F 15/00331* (2013.01); *B01F 15/00538* (2013.01); *B06B 1/16* (2013.01); *B01F 2215/0026* (2013.01)

(58) Field of Classification Search
CPC .............. B01F 11/0094; B01F 11/0097; B01F 15/00181; B01F 15/00207; A47J 37/0786

USPC ................................. 366/114, 115, 116, 128
See application file for complete search history.

(56) References Cited

U.S. PATENT DOCUMENTS

| 1,644,175 A * | 10/1927 | Church | B65G 65/44 193/2 B |
| 2,246,497 A * | 6/1941 | Beck | B06B 1/163 222/161 |
| 2003/0015188 A1* | 1/2003 | Harbin | A47J 37/0754 126/25 R |
| 2004/0228117 A1* | 11/2004 | Witzel | F21V 33/008 362/92 |
| 2007/0085496 A1* | 4/2007 | Philipp | A61B 17/151 318/139 |
| 2015/0194041 A1* | 7/2015 | Allen | H04Q 9/00 340/584 |

* cited by examiner

*Primary Examiner* — Marc C Howell
(74) *Attorney, Agent, or Firm* — Myron Greenspan; Lackenbach Siegel LLP

(57) ABSTRACT

The disclosure provides for device for agitating a grill. The device includes a vibrational device, a power source, and a control circuit; wherein the control circuit controls the vibrational device and the power source provides power to the vibrational device. A pan of the grill houses one or more pieces of charcoal and the device is integrated into the pan. When turned on, the vibrational device vibrates at a high frequency. This vibration is translated into the pan and causes the pieces of charcoal to vibrate as well. The device is capable of withstanding a high temperature of the pan when the grill is cooking one or more pieces of food.

19 Claims, 11 Drawing Sheets

GRILL COOKING DEVICE

PRIORITY

This application claims the priority benefit of U.S. Provisional Application No. 62/344,202, filed Jun. 1, 2016, which is incorporated by reference in its entirety into this application.

BACKGROUND

Barbeque grills are commonly used to cook meat and vegetables. Such grills typically include a grid to support the food and separate the food from a heat source below the grid. Barbeque grills are generally heated by either gas or charcoal.

When ignited, charcoal begins to combust, creating an ash. After some time, an outer surface of the charcoal can become coated with ash after it has burned. This ash coating insulates the charcoal and reduces the heat dissipation to the food. This decrease in temperature causes the heat source in the barbeque grill to fluctuate, creating an inconsistent and inefficient heat source.

Typically, the ash may be removed by manual efforts in agitating the charcoal. For example, a user may hit or shake the barbeque grill, stir the charcoal, or blow on the charcoal surface. However, these methods are relatively ineffective, inconvenient, and unsafe, as each can result in dislodging the charcoal, which may cause burns or can cause ash to become airborne, which may result in the inhalation of ash or the depositing of ash on the food being cooked.

SUMMARY

Exemplary embodiments described herein include a grill cooking device. Typically, a grill that uses charcoal as a heating source to cook food may become inefficient and/or cook food unevenly. This may occur because charcoal, once ignited, may become coated in ash. This ash may affect the heating dissipation from the charcoal. In an exemplary embodiment, the grill cooking device may be configured to physically agitate the grill or a grill component. Because the charcoal is housed in the grill, the charcoal may in turn be agitated, causing the ash to be shaken from the charcoal. The grill cooking device may be a discrete component or may be integrated into a grill.

In an exemplary embodiment, the grill cooking device may include a motor, a power source; and a control circuit. The control circuit may control the motor and the power source may provide power to the motor. The grill cooking device may be located near or configured to attach to a pan of the grill. The pan of the grill may support one or more pieces of charcoal. The grill cooking device may also be located near or configured to attach to a housing of the grill.

When the grill cooking device turns on, the motor may vibrate, which may cause the pan and the pieces of charcoal to vibrate. This vibration may cause any ash on the pieces of charcoal to be dislodged.

The control circuit may further include a receiver and a controller. The receiver may accept commands from a controller. The controller may include, but is not limited to, a phone, a tablet, or a computer. The controller may communicate with the receiver through a wired or wireless connection.

In an exemplary embodiment, the grill cooking device may include any combination of features. The grill cooking device may include a light source. The light source may act to illuminate the items being cooked. In addition, or alternatively thereto, the light source may, through any spectroscopic change(s) in the molecular composition of the items being cooked, measure the level of changes in the items' spectrum and thus detect, analyze, estimate, and/or output how cooked a certain item is on the cooking surface. The grill cooking device may include one or more temperature sensors. The grill cooking device may include a temperature sensor to detect a temperature of the charcoal and/or the food being cooked. The temperature sensor may be a laser or thermocouple. The grill cooking device may include an optical sensor that may detect ash on the pieces of charcoal. The grill cooking device may include a timer that causes the motor to turn on or off after a preset time has elapsed. The grill cooking device may include a wireless or wired receiver or other communication or input port for receiving or transmitting information, data, or control signals. The grill cooking device may include a speaker, alarm, bell, or other audio device. The grill cooking device may include a fan. The grill cooking device may include a liquid dispenser.

DRAWINGS

DETAILED DESCRIPTION

Figure 1:
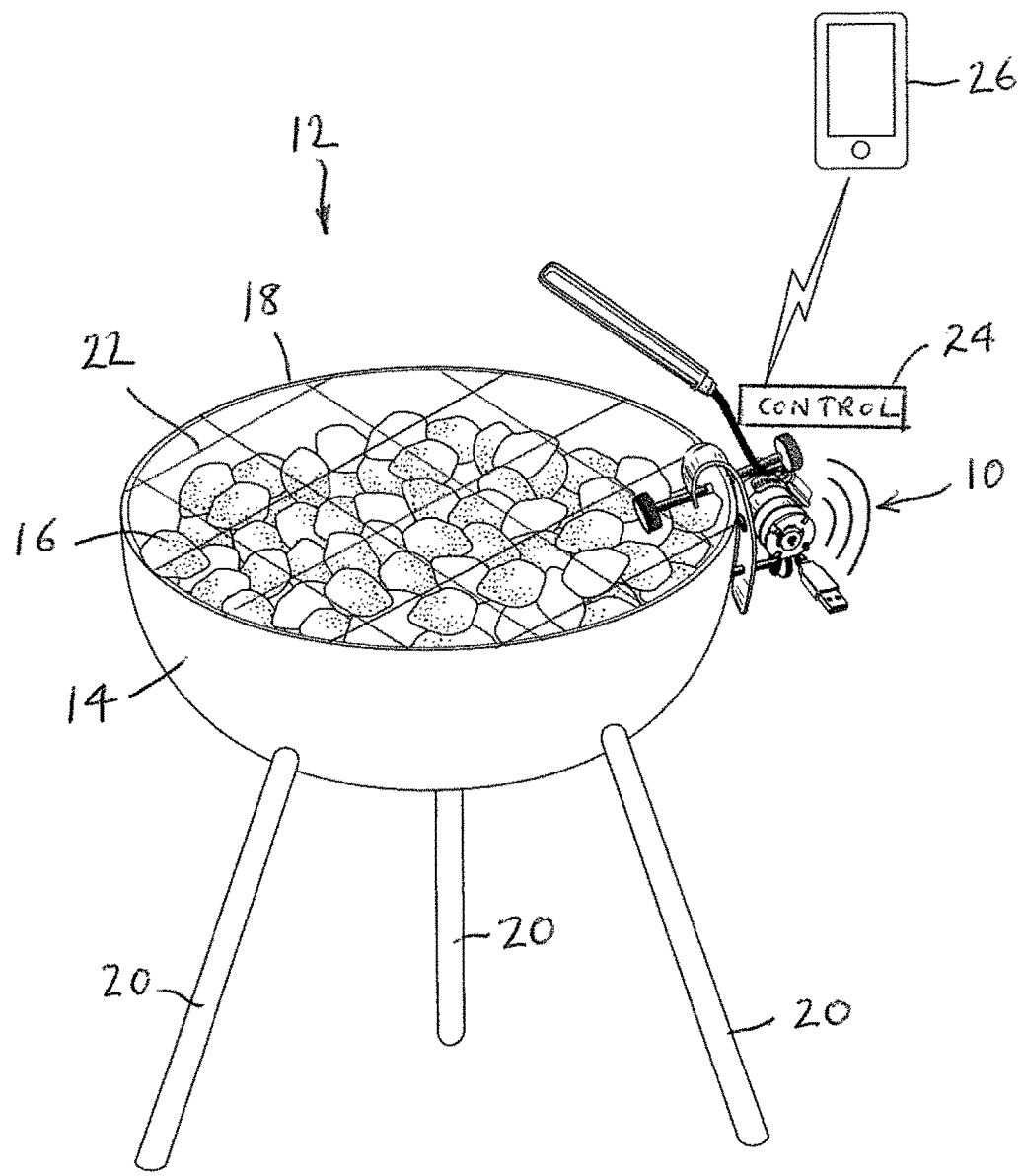
FIG. 1 illustrates a perspective view of an exemplary embodiment of a barbeque grill.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

As used herein, the terms "about," "substantially," or "approximately" for any numerical values, ranges, shapes, distances, relative relationships, etc. indicate a suitable dimensional tolerance that allows the part or collection of components to function for its intended purpose as described herein.

Exemplary embodiments described herein include a grill cooking device. Typically, a grill that uses charcoal as a heating source to cook food may become inefficient and/or cook food unevenly. This may occur because charcoal, once ignited, may become coated in ash. This ash may affect the heating ability of charcoal. In an exemplary embodiment, the grill cooking device is configured to physically agitate the grill. Because the charcoal is supported by the grill, the charcoal may in turn be agitated, causing the ash to be shaken off the charcoal. The grill cooking device may be a discrete component or may be integrated into a grill. In essence, the grill cooking device may digitize the heat flux control of the charcoal through one or more vibrational pulses.

In an exemplary embodiment, the grill cooking device may include a housing. The housing may support or enclose a motor, a power source, and a controller. The grill cooking device is configured to attach to the grill and agitate the charcoal to remove the ash layer.

In an exemplary embodiment, the grill cooking device may include a motor. The motor may vibrate and thus mechanically agitate the grill. The motor may be a rotational motor with an offset weight at one end of the motor. The motor may also or alternatively be a linear vibrator that extends linearly or horizontally in a direction of travel. The motor may also or alternatively be a piezo electric motor. The word "motor" may represent a broad range of mechanical devices capable of vibrational motion. The grill cooking device may be configured to vibrate for a pre-set period of time, to vibrate intermittently, to turn on upon a designated event (such as a temperature threshold or time lapse), or other control configuration.

In an exemplary embodiment, the offset weight may be approximately 100-150 grams in weight.

In an exemplary embodiment, the motor may vibrate at a high frequency.

In an exemplary embodiment, the motor may vibrate at a resonant frequency.

In an exemplary embodiment, the motor may vibrate at a frequency of approximately several hundred hertz.

In an exemplary embodiment, the motor may vibrate for a period of approximately a few seconds, such as 1-30 seconds, 1-10 seconds, 2-10 seconds, 1-5 seconds, 2-3 seconds, and any combination therein and thereof.

In an exemplary embodiment, the grill cooking device may include a connector that allows it to be removably attached to the grill. The connector may include, but is not limited to, a hook mechanism, a screw mechanism, a magnet, a clamp mechanism, or any combination thereof. For example, one or more magnets may be located on the accessory such that the magnets may interact with the grill. A hook may also be located on the accessory, such that a hook may interact with a top portion or lip of the grill in addition to the magnets interacting with an exterior outside surface of the grill. The hook may allow a cover for the grill to be placed on top of the grill.

In an exemplary embodiment, the connector may come into direct contact with the pan of the grill. Because the pan may become hot during operation of the grill, the connector and/or grill accessory may be able to withstand a sufficiently high temperature.

In an exemplary embodiment, the grill accessory may include a controller. The controller may turn the motor on and off. The controller may be mechanical and/or electrical. For example, the controller may be a button, switch, toggle, touch screen, or other user input that permits the user to turn the grill accessory on and off. The controller may include a processor, timer, receiver, or other mechanism of receiving instructions or signals to turn the controller on and off either at the grill accessory and/or received from a user through a remote device. In an exemplary embodiment, controller includes a timer, temperature sensor, processor, and combinations thereof for determining based on data received from the timer and/or temperature sensor whether to turn the grill accessory on or off.

In an exemplary embodiment, the grill accessory may include a light source. The light source may include, but is not limited to, a light emitting diode (LED) or a light bulb.

In an exemplary embodiment, the grill accessory may include a laser. The laser may be an infrared laser and may be able to detect a temperature of the food being cooked. The laser may also or in addition thereto detect the spectroscopic changes of the food being cooked.

In an exemplary embodiment, the grill accessory may include a temperature sensor. The temperature sensor may detect a temperature of the charcoal and/or the food being cooked. The temperature sensor may also relay information to the controller and/or an output device on the accessory.

In an exemplary embodiment, the grill accessory may include a receiver. The receiver may accept commands from a controller. The controller may include, but is not limited to, a phone, a tablet, or a computer. The controller may communicate with the receiver through a wired or wireless connection. The wireless connection may include, but is not limited to, a local area network (LAN), Bluetooth, WiFi, or combinations thereof.

In an exemplary embodiment, the controller may include an application. This application may be executed on a remote electronic device and receive input from a user and/or provide information to the user. The application may communicate over the wired or wireless connection to provide commands to the receiver. This application may provide information to the user from the grill accessory.

Although embodiments of the invention may be described and illustrated herein in terms of a grill accessory for a charcoal grill, it should be understood that embodiments of this invention are not so limited, but are additionally applicable to other grills. Exemplary features disclosed herein may be used in any combination, such that features may be removed, duplicated, integrated, separated, or otherwise recombined and remain within the scope of the instant disclosure.

FIG. 1 illustrates a perspective view of a barbeque grill. The barbeque grill may be any conventional charcoal grill. As shown in FIG. 1, a barbeque grill may include a pan 14, one or more pieces of charcoal 16, a grate 22, a grill accessory 10, and one or more legs 20. The pan 14 may be approximately semi-spherical and hollow and may be supported by the one or more legs 20. The pan 14 may include any other grill configuration, such as having a circular, ovoid, rectangular, square, or other cross section. The grate 22 may rest on a top portion of the pan 14, such as an upper ledge or internal lip or protrusions within the upper region or outer edge of the pan. The one or more pieces of charcoal 16 may be placed inside of the pan such that the grate 22 may be above the charcoal 16. The charcoal 16 may rest directly on the pan or on a second grate (not shown). The second grate may be supported by the internal surface of the pan. The internal surface of the pan may include a ledge, lip, indentation(s), or be shaped to support the first and second grate at a specific location along the internal surface of the pan to define a static relative distance between the first grate, second grate, and/or the pan.

In order to cook food using the barbeque grill, the pieces of charcoal 16 may be ignited. Food may then be placed on top of the grate 22. The ignited charcoal 16 may provide a heat source to cook the food. However, once ignited, charcoal 16 may become coated in an ash, which in turn reduces the heat provided by the charcoal 16 to the food. This may cause the food to cook unevenly and/or inefficiently. The accessory may mechanically agitate the pan, which may in turn agitate the charcoal 16, causing the ash to fall off of the charcoal 16. The accessory may mechanically agitate the charcoal directly.

As shown in FIG. 1, the accessory 10 may include a control circuit 24 and a controller 26. The controller 26 may include an electronic device such as, but not limited to, a phone, a computer, or a tablet. The controller 26 may communicate with the control circuit 24. The controller 26 may communicate with the control circuit 24 through a wired connection or wirelessly. Exemplary wireless connections may include, but not limited to, Bluetooth, Wi-Fi, or radio frequency (RF). Exemplary wired connections may include USB, micro-USB or other port 58. The controller 26 may therefore be separate and remote from the grill, the grill accessory, and/or the control circuit 24.

The controller 26 may be configured to display information to a user and/or receive information from a user. The control circuit 24 may include a receiver and/or transmitter. The controller 26 may communicate with the receiver/transmitter. In an exemplary embodiment, the controller includes a processor and memory. The controller may include an application stored in memory and/or retrieved from a remote memory source, such as through a browser, and when executed by the processor is configured to display a user interface to the user. The user interface may be configured to receive and display information to the user. Exemplary information displayed to the user may include temperature from the one or more temperature sensors of the grill accessory described herein, an elapse time, cooking tips (such as preferred cooking temperatures and/or times), or other information related to or retrieved directly or indirectly from the grill accessory, the grill, or the food. The user interface may be configured to provide one or more user controls for controlling or communicating with the grill accessory. For example, the user interface may include controls for turning on and/or off exemplary features of the grill accessory, such as, for example, the light, the motor, the one or more temperature sensors, the timer, etc. The user interface may include controls for setting preferences or controls for the grill accessory, such as, for example, setting a timer, a threshold temperature, setting a duration, selecting a mode, or other preferences, features, controls, inputs described herein.

In an exemplary embodiment, the accessory may be coupled to an upper portion of the pan. As shown in FIG. 1, a bracket of the accessory may hook onto a lip 18 of the pan, and may be located proximate the grate 22.

The bracket 34 may include an upper portion that is substantially U-shaped 34a and a lower portion that is elongated 34b. The elongated lower portion may approximate a linear planar or curved planar surface. The bracket may include other hook shapes, such as more linear/squared off to approximate a portion of a rectangular cross section. The lower portion 34b may be shaped to approximate an exterior surface of the grill pan. For example, for the semi-spherical grill illustrated in FIG. 1, the lower portion may be approximately liner in a first direction (generally horizontal in a use position) and curved in a second dimension perpendicular to the first dimension. The curvature may approximate the curvature of the spherical exterior surface of the grill. The lower portion may approximate an average surface shape across different grill models, shapes, sizes, etc.

The bracket 34 may also allow the accessory to be coupled to the grill. The bracket may therefore include one or more connectors. In an exemplary embodiment, the bracket may include a hook, and the hook portion may include a removable attachment portion. As shown, the hook portion comprises the u-shaped portion 34a. The U-shaped portion 34a may hook onto an upper portion of the pan. The U-shaped portion 34a may include outwardly opposing portions 34a' and 34a" that may be connected by an approximately arcuate connecting portion 34c. The opposing portions 34a' and 34a" may be spaced sufficiently apart such that the U-shaped portion 34a may receive a lip of the pan. The opposing portions 34a' and 34a" may also each include a threaded hole 38. A threaded screw or bolt 40 may be threadedly meshed through each of the threaded holes 38. Each threaded screw or bolt 40 may include a knob 42 at a terminal end of the screw or bolt 40. The knob 42 may allow a free end 44 of each the screw or bolt 40 to move, which may in turn allow a space 60 in between the two screws or bolts 40 to vary in size. In an exemplary embodiment, one of the screw/hole combinations may be replaced with an inwardly projecting protrusions, such that it approximates the presence of one of the screw extensions, but is permanently attached thereto. In this case, one side of the attachment hook directly rests against the grill and a single screw is used to secure the accessory to the grill by reduced a space between a side of the hook portion and a terminal end of a screw portion, thereby capturing the grill in between. The screws and/or projections may be linearly aligned such as along axis $A_T$. The bracket 34 may comprise other removable attachment portion in addition and/or alternatively to the exemplary configuration of FIG. 1. For example, the bracket may include a hook, clamp, projection/protrusions, detent, deformable surface/structure, spring, screw, magnet, buckle, tie, ratchet, clip, button, snap, other securing mechanism, or combinations thereof.

The lower portion 34b may also include a portion to transmit vibration from the motor to the grill. As shown, the transmission portion may include a projection from a surface of the bracket toward the surface of the grill. As shown, the bracket includes a threaded hole 48, and a vibration screw or bolt 46 threadedly meshed through the threaded hole 48. The vibration screw may include a knob 42 on a terminal end and a tip 50 on another terminal end, opposite the knob 42. The tip 50 may be approximately on the same side of the bracket as the space 60. The tip may include a heat resistant surface and/or soft impact surface to interface with the exterior surface of the grill. In an exemplary embodiment, the tip may be magnetic.

Figure 2:
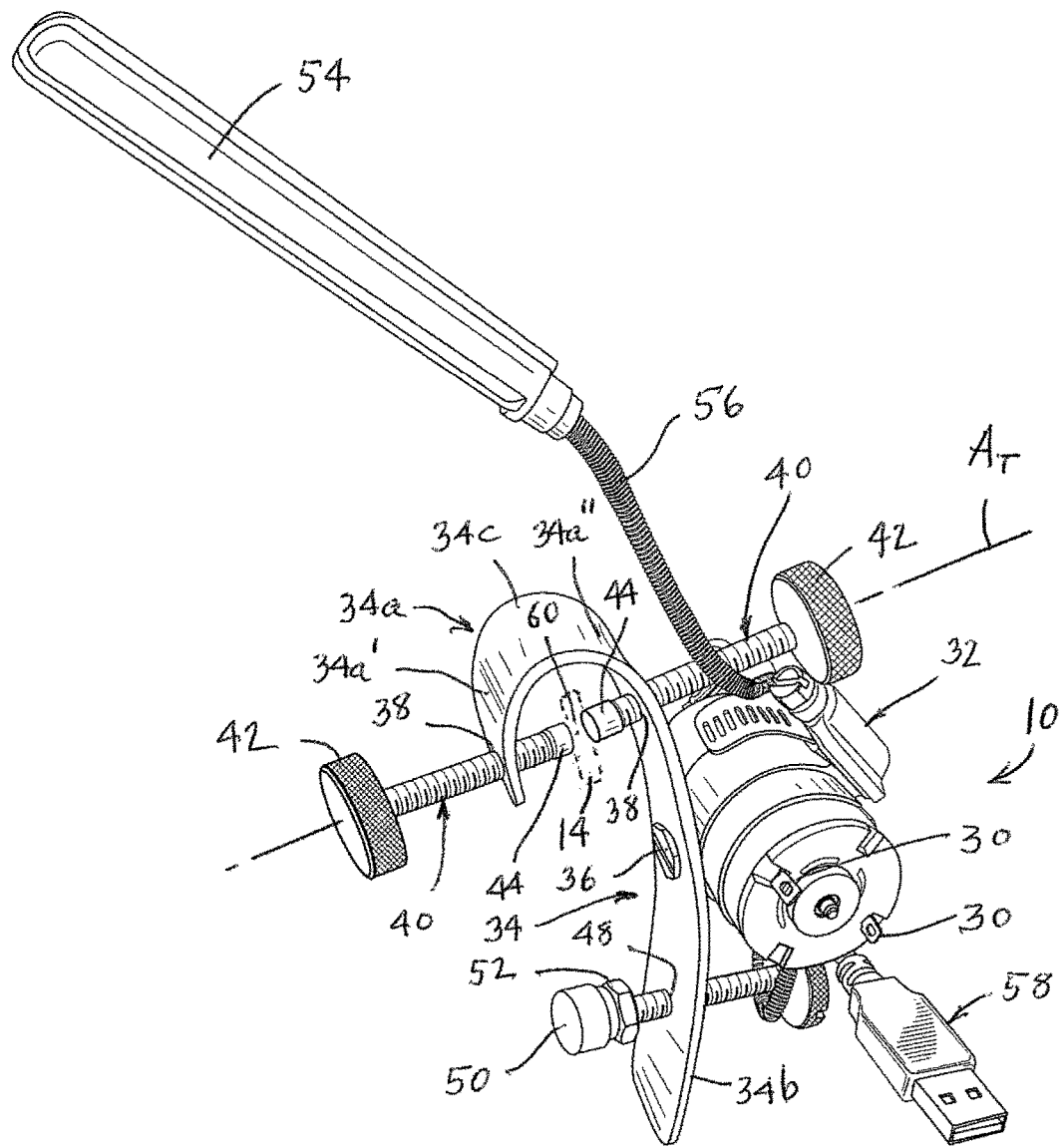
FIG. 2 illustrates a perspective view of an exemplary embodiment of a grill cooking device.

In an exemplary embodiment, the contact points between the grill accessory and the grill is minimized to reduce heat transfer to the accessory. For example, the accessory is configured to contact the grill at a hook portion, and/or at one, two, three, or four discrete contact points. As shown in FIG. 2, the grill accessory contacts the grill surface at three points outside of the top support of the hook portion. These contact points include the tip of screws 42, 46. The contact points may be integrated projections on the bracket or grill assembly, or may be movable/removable with respect to the bracket, such as by screws. The top surfaces of the hook may also include one or more projections to minimize contact and create discrete contact points along the hook surface.

In an exemplary embodiment the bracket 34 supports a vibration mechanism. The vibration mechanism may have a motor. The bracket 34 may be physically coupled to the motor 28. As shown, an adjustable strap 32 attaches the motor to the bracket. Other or additional attachment mechanisms may be used, such as any described herein, including, without limitation, ratchet, belt, tie, button, clasp, snap, hook and loop, deformable arms, screw, clamp, elastic band, other securing mechanism, or combinations thereof. The motor may create the vibration or shaking to the grill. In an exemplary embodiment, the vibration mechanism includes a motor and off axis weight.

In an exemplary embodiment, the grill accessory may include additional features associated with the vibration function, grill, food, or other desired attribute. For example, the grill accessory may include a switch, temperature sensor, timer, display, light source, wired or wireless communication port (e.g. USB, mini-USB, Wi-Fi, Bluetooth, Radio Frequency, etc.), power supply, power supply connector, controller, transmitter, receiver, speaker, projector, spectroscope, laser measure, fan, liquid dispenser, camera, audio source, temperature sensor, humidity sensor, other sensors, and any combination thereof.

FIG. 2 illustrates a perspective view of an exemplary grill accessory. As shown in FIG. 2, the grill accessory may include a motor 28, a bracket 34, a power source, a light source 54, and a communication port 58. The light source 54 may be connected to the grill accessory by a support arm, such as a hose 56. The hose 56 may be flexible, which may allow the position of the light source 54 to be moved such that a light from the light source 54 may be used to illuminate different areas. The hose 56 may maintain its shape/position, but may be deformable when an external force is applied thereto. Any support may be used for the light source 54, such as pivoted, jointed, telescoping, and/or movable or rigid arm segments.

Figure 4:
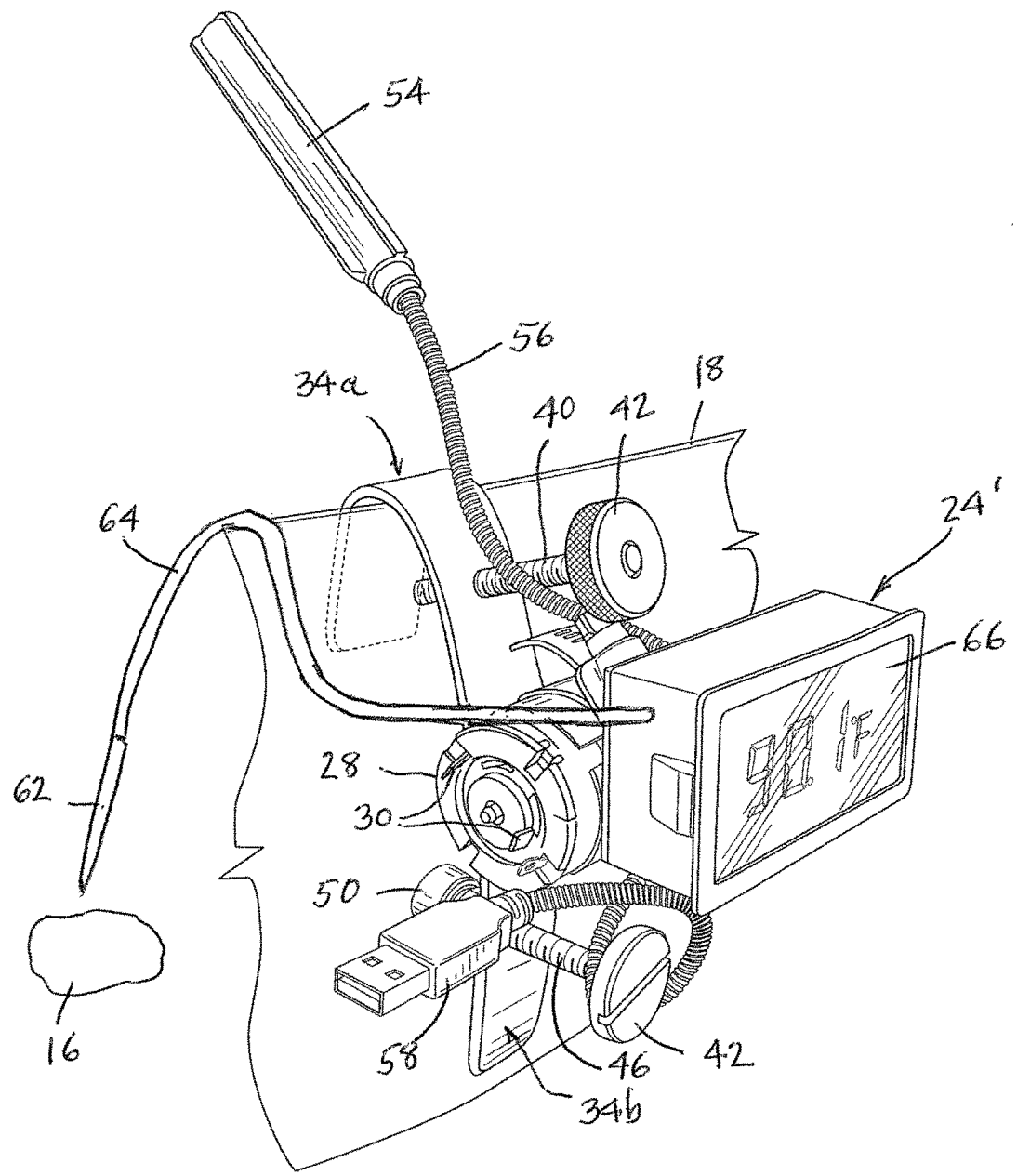
FIG. 4 illustrates an exemplary embodiment of the grill cooking device.

FIG. 4 illustrates a perspective view of an exemplary grill accessory. The grill accessory may include a temperature sensor and/or a temperature display. As shown in FIG. 4, the grill accessory may include a control device 24' and a thermocouple 62. The thermocouple 62 may be connected to the control device 24' by a cable 64 that extends over the lip 18 of the pan. The thermocouple 62 may detect a temperature of the charcoal 16. The control device 24' may also include an output 66. The output 66 may display a temperature of the charcoal 16. In an exemplary embodiment, the control device 24' may control the vibration mechanism to turn on and/or off based on the temperature received from the thermocouple. The thermocouple may be positioned in a space adjacent the coal to detect a radiant heat from the coal. In an exemplary embodiment, the thermocouple may be configured to position the thermocouple in a static position relative the coals, the grill, and/or the grill accessory, or a component thereof. In an exemplary embodiment, the thermocouple may be configured to dynamically positioned relative the coals, the grill, and/or the grill accessory, or a component thereof. In an exemplary embodiment, the thermocouple may be positioned near the food to detect a grilling temperature felt at a cooking space. In an exemplary embodiment, a plurality of temperature sensors may be used to detect a temperature at different locations in the grilling space. Therefore, a temperature distribution may be monitored.

In an exemplary embodiment, the control device 24' is configured to turn on the motor if the temperature is detected below a first threshold value. The control device 24' may be configured to keep the motor on until the temperature exceeds a second threshold value. The first threshold value may be the same as the second threshold value. The first threshold value may be lower than the second threshold value. In an exemplary embodiment, the control device 24' is configured to turn off after a duration of time. In an exemplary embodiment, the control device 24' may be configured to turn on the motor if a temperature difference detected between any two temperature sources exceeds a first difference threshold. The control device 24' may be configured to turn off the motor if the temperature different is below a second difference threshold or for a duration of time. The first difference threshold may be the same as the second difference threshold. The first difference threshold may be greater than a second difference threshold.

In an exemplary embodiment, the thermocouple may include a needle type exterior for piecing a food to be cooked. In this case, the thermocouple may be used to detect a cooking temperature of the food. The temperature sensor may communicate with a display and display an internal temperature of a cooked food.

Figure 3:
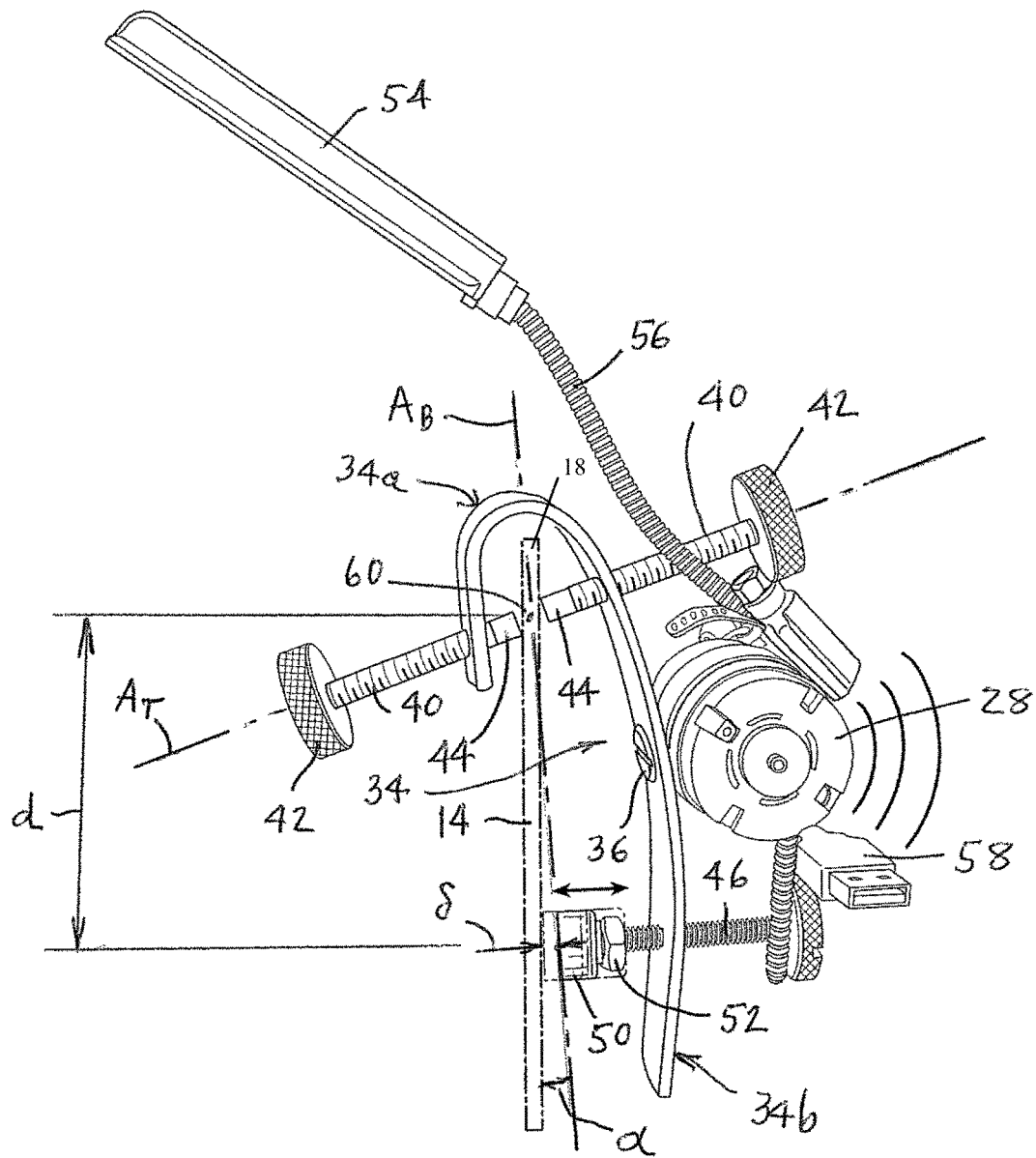
FIG. 3 illustrates an exemplary embodiment of a grill cooking device as engaged with a portion of the grill.

FIG. 3 illustrates the grill accessory as engaged with the grill. As shown in FIG. 3, the space 60 between the threaded screws or bolts 40 may receive a lip 18 of the pan. Once the accessory is placed on the pan, the screws or bolts 40 may be rotated in order to make the space 60 smaller, such that the free end 44 of the screws or bolts 40 secure the accessory onto the lip 18 of the pan. It may be understood that the bracket 34 may have a degree of freedom of movement relative to the pan since it may only be secured at the U-shaped portion 34a.

The screws or bolts 40 may be adjusted such that the tip of the vibration screw 50 and the pan 14 may have a gap 6 between them and the tip of the vibration screw 50 may be at an angle α to the pan 14. The axis of the attachment screws 40 may also be angled with respect to the pan surface such that the screws project at a non-zero angle from normal of the pan surface at the point of contact.

The motor 28 may vibrate when turned on, which may in turn cause the bracket 34 to vibrate. This, in turn, may cause the tip 50 to vibrate, and as such, repeatedly come into contact with the pan 14. The tip 50 may transmit this vibration to the pan 14, as the tip 50 may cause the pan 50 and the pieces of charcoal held within the pan, to move when the tip contacts the pan 14. This movement may cause ash that has developed on the surface of the pieces of charcoal to become dislodged.

Figure 5:
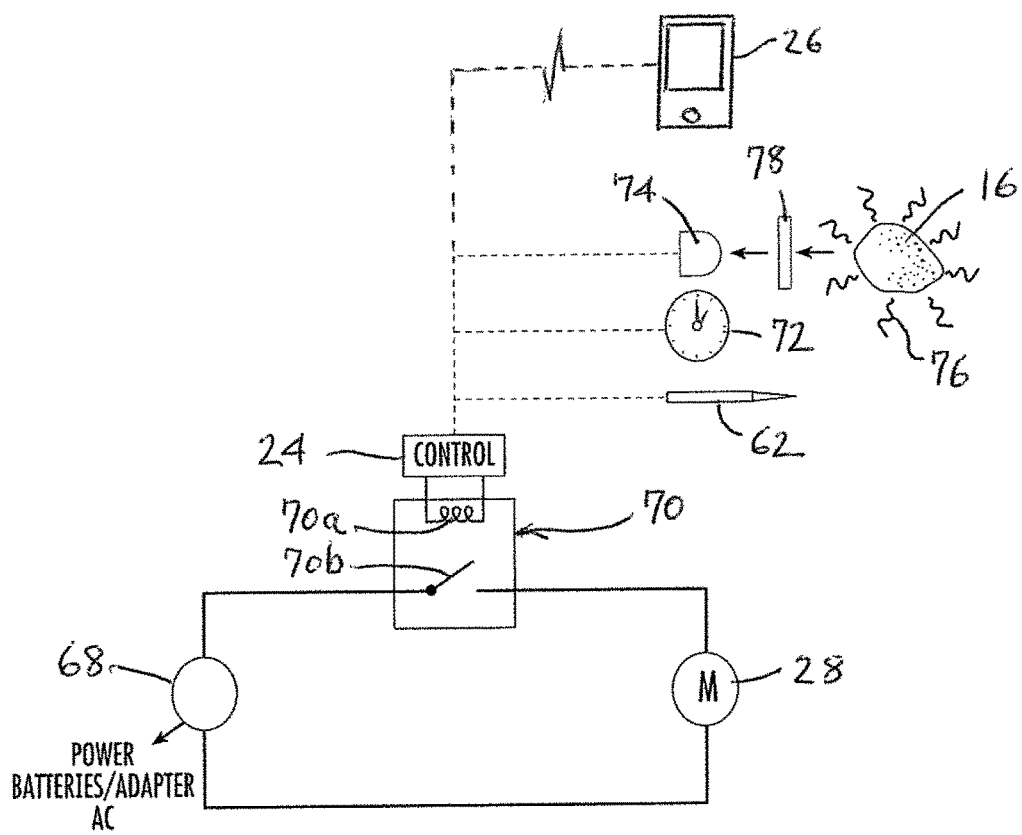
FIG. 5 illustrates a circuit schematic of an exemplary embodiment of a grill cooking device and various modes of controlling the grill cooking device.

FIG. 5 illustrates a circuit schematic of the grill accessory and various modes of controlling the grill accessory.

The motor 28 may be connected to a power source, as illustrated in FIG. 5. The power source may include, but is not limited to, a USB connection 58, one or more batteries, AC power cord, DC power, or any combination thereof. The motor 28 may be controlled by the control circuit 24 as described herein.

As shown in FIG. 5, the motor 28 may be connected to a power source 68. The power source 68 may vary depending on a power requirement of the motor. The power source 68 and the motor 28 may be connected by an electro-mechanical (EM) component 70. The EM component 70 may further include a coil 70a and a switch 70b. The switch 70b may be open until the coil 70a is energized, thus no power may be applied to the motor 28 unless the coil 70a is energized and the motor 28 may not vibrate until the coil 70a is energized. As shown in FIG. 5, the grill accessory may be turned on, and the coil 70a energized, manually or automatically. The grill accessory may be turned on by the controller 26, as described herein, by energizing the coil and closing the switch. Other control mechanisms, and switch configurations for turning the motor on and off or otherwise controlling features of the grill accessory described herein are within the scope of the present description.

The grill accessory may be turned on by a sensor as described herein. A sensor, such as an optical sensor 74, may receive optical radiation from the charcoal 16. The optical sensor 74 may detect ash 78 on the pieces of charcoal 16. In the event the optical sensor 74 detects ash, the optical sensor 74 may send a signal to the control circuit 24, which may in turn cause the coil 70a to become energized, thus causing the grill accessory to turn on. The optical sensor may be used to detect the presence of ash visually, such as by monitoring a color change or detecting variations in a detected image. The optical sensor can also be used to detect a temperature of the charcoal, such as with a thermo-optical sensor.

The grill accessory may be turned off based on a timer 72. The timer 72 may be set such that the control circuit 24 turns off the motor 28 after a preset time has elapsed from when the motor was turned on. The timer 72 may also be set to send a signal to the control circuit 24 to turn off the motor 28 after the motor 28 remains on for a second preset amount of time. In an exemplary embodiment, the timer 72 may be programmed such that the motor 28 turns off after approximately a few seconds, such as 1-30 seconds, 1-10 seconds, 2-10 seconds, 1-5 seconds, 2-3 seconds, and any combination therein and thereof, of vibrating. The preset time may be programmed and static to the grill accessory, may be programmable such as through a communication interface or the control circuit, or may be automatically dynamically determined based on other programmed or sensed conditions (etc. it may shake for a longer time if a detected humidity is higher). In an exemplary embodiment, the grill accessory may be turned on by the time, such that the grill accessory is configured to vibrate at specified intervals during a grilling time, with or without the use of the temperature sensor control.

The grill accessory may be turned on by a thermocouple 62. The thermocouple 62 may detect a temperature of the pieces of charcoal and notify the control circuit 24 of the temperature. In the event that the temperature of the charcoal decreases beyond a preset temperature, the control circuit 24 may turn on the motor 28. Once the temperature of the pieces of charcoal reaches and/or exceeds the preset temperature, the motor 28 may be turned off by the control circuit 24.

As seen in FIG. 5, any combinations of control features may be used independently, simultaneously, selectably, or in other combinations. The control circuit may receive data from the one or more information sources, such as a timer, temperature sensor, optical sensor, thermocouple, etc. and control a switch to start or stop the vibration mechanism 28 of the grill accessory.

FIGS. 6A-6D illustrates perspective and different elevation views of an exemplary embodiment of the grill accessory. The exemplary embodiment of FIG. 6 includes features as described herein, including bracket 34, controller 26 having a display, first and/or second removable attachment portions, a light, and a housing body. The bracket 34 may include a hook 84. The hook 84 may include a first attachment mechanism 89 and a second attachment mechanism 88. As described herein, the first attachment mechanism 89 may include a screw 40 and knob. The second attachment mechanism 88 may include a magnet. This may allow the grill accessory to latch onto a lip of the pan of the grill while still providing substantially quick connectability to the grill via the magnet. The exemplary features described with respect to FIGS. 6A-6D are enclosed or contained within a single accessory body 90.

In an exemplary embodiment, the controller 26 may include an output 66. The output 66 may be a screen that may provide information such as, but not limited to, a temperature of food being cooked, a temperature of the charcoal, an amount of time elapsed since the grill has been turned on, an amount of time left until the food is done being cooked, or any combination thereof.

Figure 6:
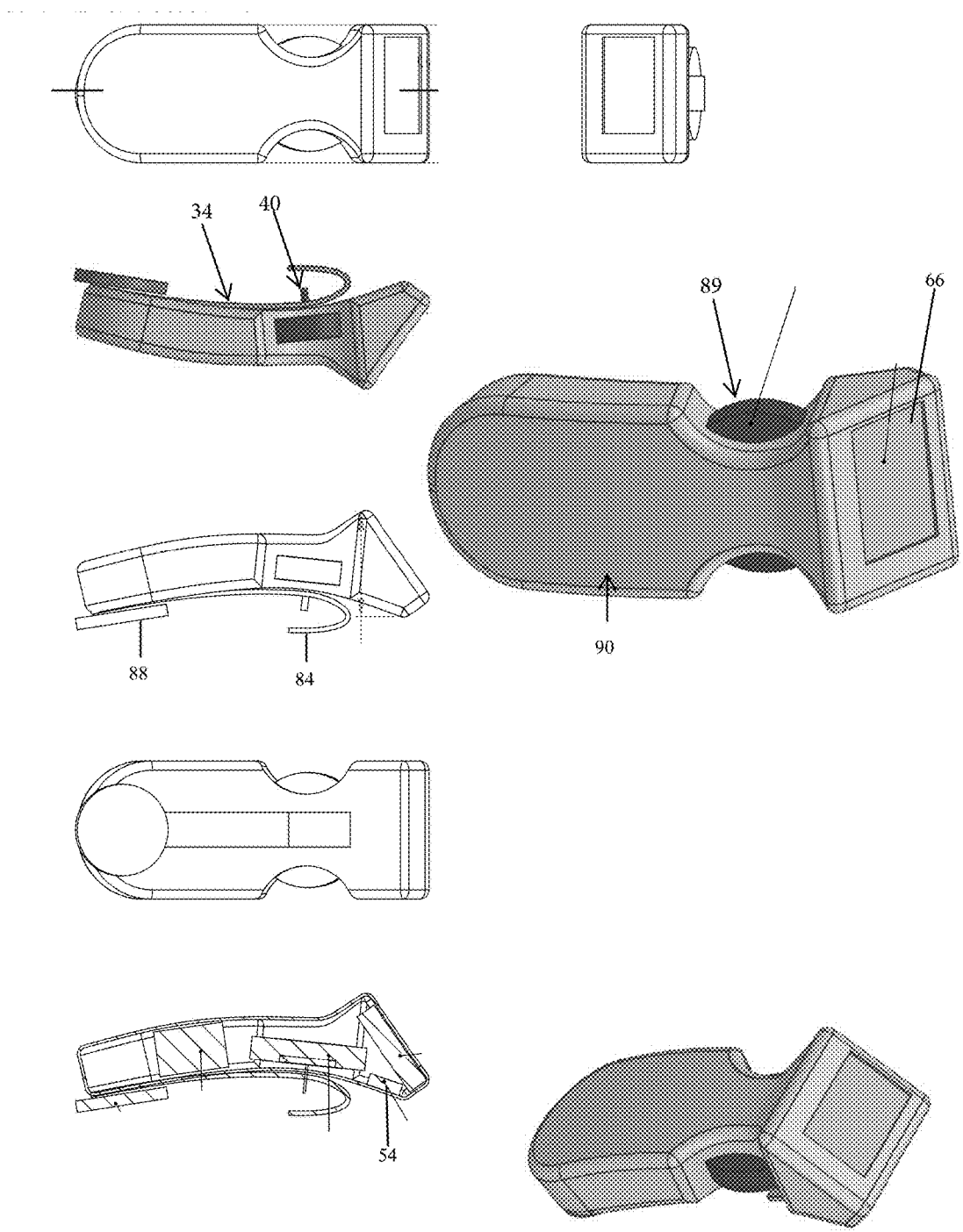
FIG. 6 illustrates a schematic of an exemplary embodiment of a grill cooking device.

As shown in FIG. 6, the grill accessory may include a light source 54. The light source may, for example, be one or more light emitting diode(s) (LED). The light source 54 may be controlled through the controller 26, independently through a switch, or control interface. In an exemplary embodiment, the knob 89 may be a control input instead of or in addition to the knob associated with screw 40. In an exemplary embodiment, a static projection may be used instead of screw and knob used as a control input. Therefore, as shown, the light controller 88 may be a wheel. The light controller 88 may control the light source 54 in order to turn on and/or off the light source 54 and/or adjust an intensity of the light source 54. The wheel may also control selections displayed on the screen 66, such as turning on/off the vibration mechanism, turning on/off a light source, turning on/off temperature reading, and combinations thereof.

In an exemplary embodiment, the accessory body 90 may be approximately 2-5, and approximately 3 inches wide and 5-10, and approximately 7.5 inches long, and under approximately 2.5 inches thick.

FIGS. 7A-8E illustrate exemplary embodiments in which the grill device is integrated within the grill body. The integration may be through the grill body being a monolithic, integral extension of at least a portion of the housing or enclosure of the grill device. The integration may also be through direct attachment of the grill device to the grill body. The integration into the grill body is permanent or semi-permanent in that it requires disassembly to disassociate the grill device from the grill body. The removable configuration or non-permanent attachment permits easy attachment and reattachment of the grill device to the grill body for easy installation and use.

Figure 7A:
FIGS. 7A-7E illustrate different views of an exemplary embodiment of a grill cooking device integrated into a grill.

FIGS. 7A-7E illustrate various views of an exemplary embodiment of a grill cooking device that is integrated into a grill. As shown in these figures, the grill cooking device may include an output that is located on an exterior surface of the pan of the grill. The grill may also include a lid or a cover, which may fit on top of the pan of the grill, as illustrated in FIG. 7A. The cover may be removed.

As shown, the grill accessory may be integrated into a portion of the pan. The position may be approximate a rim or outer perimeter of the pan or may be substantially close to or proximate the pieces of charcoal or the support of the pieces of charcoal. The grill accessory may be composed of a material capable of withstanding substantially high temperatures.

Figure 7B:
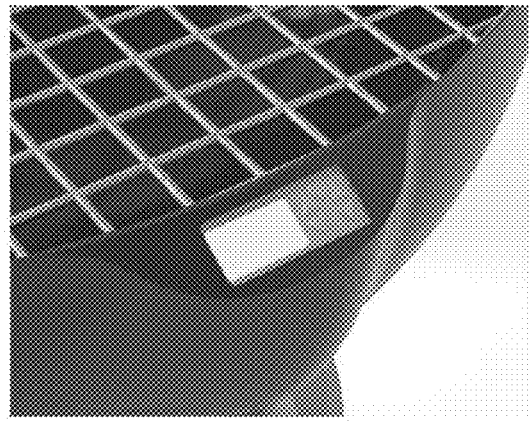
Figure 7C:
Figure 7D:
Figure 7E:
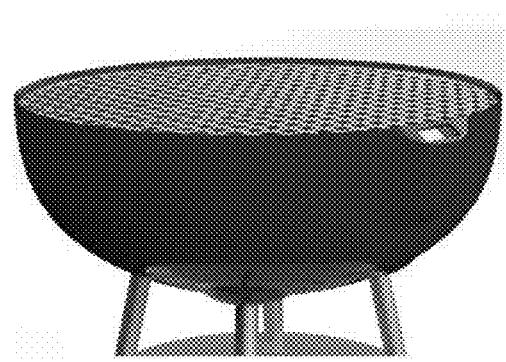

As shown in FIG. 7B, the grill accessory may include an output and one or more controls. The output may be a display that depicts the temperature of the charcoal, a temperature of the grill, a temperature of the food, a temperature of the environment, a doneness of the food, a remaining cook time of the food, a desired doneness of the food, a total anticipated or entered cook time of the food, or other output described herein, and any combination thereof. The controls may allow adjustment of various properties of the grill and grill accessory, such as, but not limited to, a desired temperature of the grill, an amount of time for the grill to be turned on, an amount of time for the grill accessory motor to be on, or any combination thereof.

FIGS. 8A-8E illustrate various views of an exemplary embodiment of a grill cooking device that is integrated into a grill. As shown in these figures, the grill cooking device may include an output that is located on an exterior surface of the pan of the grill. The grill may also include a lid or a cover, which may fit on top of the pan of the grill. The cover may be removed.

Figure 8A:
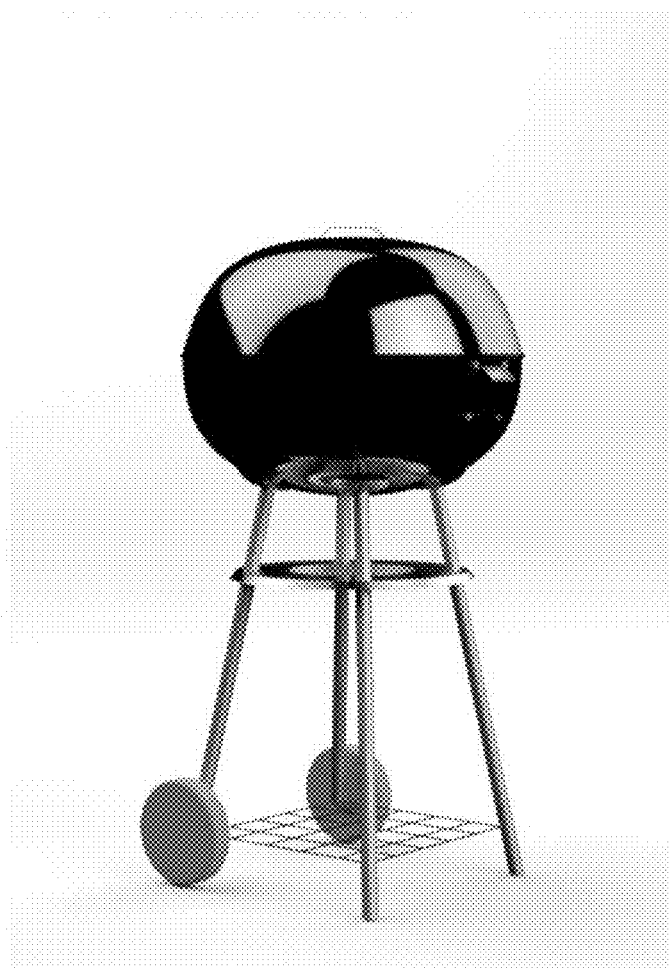
FIGS. 8A-8E illustrate a different views of an exemplary embodiment of a grill cooking device integrated into a grill.
Figure 8B:
Figure 8C:
Figure 8D:
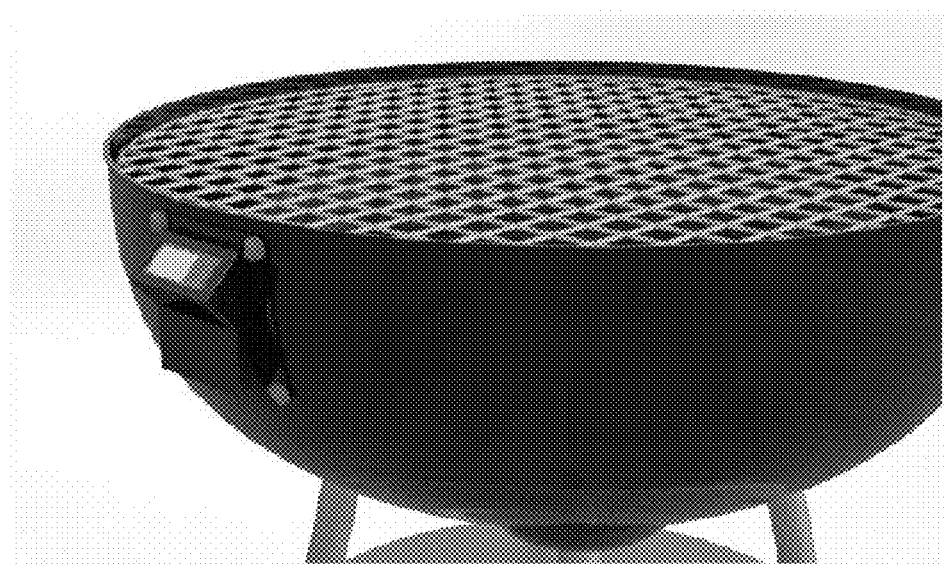
Figure 8E:
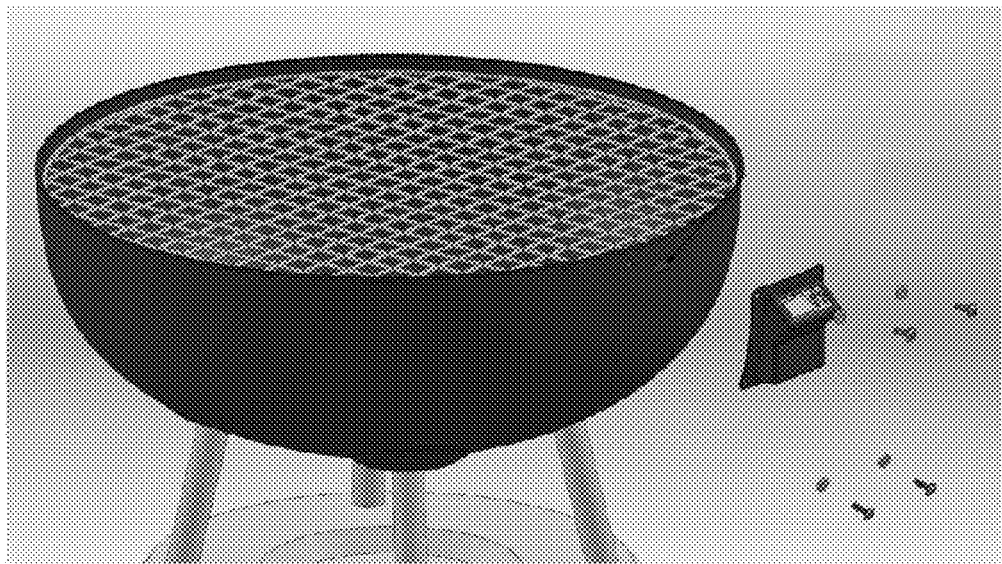

As shown, the grill cooking device may be affixed to an exterior surface of the pan of the grill by one or more screws. Other attachment devices may also be used, such as rivets, screws, adhesive, mated or formed components, apertures and projections/hooks, and any combination thereof or otherwise within the skill of the art. FIG. 8e illustrates an exploded view of an exemplary embodiment of a grill cooking device that is integrated into a grill. As shown in FIG. 8e, one or more screws and one or more nuts may be used to affix the grill cooking device to the grill. An exterior surface of the pan may also include a hole for a sensor such as, but not limited to, an infrared temperature gauge.

Exemplary embodiments comprise a grill accessory having an LED light that may last for 18 years, has an enclosed power source, is water proof, vibration proof, and may provide ample light without using up much energy (so user does not have to replace batteries often). Exemplary embodiments may be rechargeable through an exterior interface or contactless interface, such that batteries do not have to be replaced.

Exemplary embodiments may include any combination of exemplary features, such that features may be duplicated, added, removed, or otherwise recombined. For example, the grill accessory may include a temperature sensor and timer. The grill accessory may include a Bluetooth speaker and connectivity with a Wi-Fi device, such as iPad or iPhone. The grill accessory may include a projector and spectroscopic laser configured to measure how cooked the food is, and may be configured to determine the difference between medium rare and well done, and variations therebetween. The grill accessory may include a USB connection (for mini fans and other tech). The grill accessory may include an iPhone or android compatible adapter. The grill accessory may include a camera to monitor the grill and/or food to permit a user to walk away from the grill and monitor a condition of the grill and/or food with the use of a smart phone application communicating with the grill accessory. The grill accessory may include a grill scrubber, such as in a collapsible configuration having a wire brush. The grill accessory may include an alarm and a multi-colored light for stages of readiness (rare, medium rare, etc.). The grill accessory may include one or more temperature sensors. The grill accessory may include a magnet attachment. The grill accessory may include a laser to detect how cooked the food is. The grill accessory may include an internment timer on vibration to automatically vibrate (like every 1 minute). The grill accessory may include a pico projector. The grill accessory may include a temperature sensor in a feedback loop circuit with a vibration mechanism, configured so that when the temperature drops, the vibrator will be turned on to increase the temperature. The vibrator may be kept on for a set interval as indicated by a timer or by the control loop detecting a second temperature above a threshold. The grill accessory may be configured to communicate with a smart phone application run on a mobile device, where the application is configured to communicate with a controller of the grill accessory to control the vibration, or communicate with a transmitter of the grill to receive information about the food, the grill accessory, and/or the grill, such as receive an image through a camera, control a light source, get alerts at certain cooking stages (such as cooking conditions of the food, including rare, medium, well done for meat), obtain information about desired cooking times, program the grill accessory, and combinations thereof. The grill accessory may include a nozzle to spray water onto the fire when the fire temperature is too hot for cooking. The grill accessory may include a nozzle spray a basting liquid onto the cooked food.

In an exemplary embodiment, a software program may interact with a user through an input/output interface. Based on the interaction of the user, one or more sensors, one or more timers, one or more other features or components of the system, and any combination thereof, the software program may save and analyze the user behavior, and "learn" preferences of the user, and/or adjust criteria used to control the grill cooking device. For example, the grill cooking device may use a combination of a temperature and spectroscopic feedback and a timer to determine when a food item has reached a defined level of being cooked (i.e. rare, medium, or well done). The software program may control the vibrational device in order to alter the heat from the gill. The software program may also accept a desired food preference, such as a level to be cooked (e.g. rare, medium, well done), and indicate to a user when the desired level is obtained through detection sensors, timers, and combinations thereof. Thereafter, the software program may take information from the user such as that food was undercooked. The software program may also take information from the grill cooking device about the time cooked, the temperature of the grill during cooking, the temperature and/or spectroscopic feedback from the food surface, the temperature of the food interior, and combinations thereof to associate a precision of the notice to the desired preference of the user. The software program may accept any information from the user and/or grill accessory about a quality of the food, such as its doneness, its surface sear, moisture, texture. The quality of the food may be any combination of adjectives for the food such as that the food is dry. The software program may store this information and/or modify the calculations performed to determine when a specific notice is provided in subsequent uses or modify the control parameters during the cooking. For example, when a user indicates that an item was undercooked, the grill cooking device may adjust the notices in the next cooking event, such as by delaying when a notice is sent and thereby extending the cooking time, or may adjust the control parameters such as by increasing the temperature of the grill. In the event an item is indicated as dry, the software program may store this information and/or adjust cooking criteria, such as by increasing the temperature of the grill and thereby shortening the cooking time on subsequent uses. Additionally, the software program may control the vibrational device in order to increase or decrease the temperature of the grill in order to cook the food more or less according to the interaction of the software program with the user. Accordingly, the grill cooking device may user any combination of sensor feedback loops, user feedback loops, cooking criteria, or other combination of system features to adjust the grill cooking device to the preferences of a user. Therefore, even if a user enters in a desire for meat to be cooked rare, upon continued feedback that the meat is undercooked, the grill cooking accessory may control the grill and/or provide feedback to a user when an item is cooked at a well done level. The system may adjust to the individual user preference. The grill cooking device may include any number of sensors, measuring devices, features, and/or inputs such that different food items and characteristics may be accounted for and tailor any cooking experience to the individual preferences of a user. A plurality of users may also be stored, such that a single grill cooking device may be used for a household of a plurality of users. Each user preference may therefore be individually identified.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. No single feature is considered essential or necessary to the invention. Instead, the invention includes exemplary features that may be used in one or more combinations are provided herein. The scope of the invention should be determined by the claims only, and not limited by the exemplary embodiments provided herein. The lengths and measurements provided herein are exemplary only. The overall size of the grill accessory may be reduced or enlarged such that the dimensions may scale for smaller and larger embodiments. The ranges are provided for simplicity and are meant to include every measurement, at least on a 0.001 increment between and inclusive of the identified endpoints. For example, a range of 0.001 to 0.004 would include each of 0.001, 0.002, 0.003, 0.004, and any combination thereof.

What is claimed is:

1. A device for maintaining the temperature of charcoal briquettes in a BBQ substantially at a desired temperature comprising:
   a metal BBQ pan configured to receive and support charcoal briquettes to be burned to generate heat within said pan resulting in a coating of ash on the charcoal briquettes as combustion takes place, the level of heat generated by the briquettes being a function of the extent of coating of ash on the charcoal briquettes;
   vibrating means for vibrating said metal pan and the charcoal briquettes supported therein; support means for supporting said vibrating means at least one of on and in close proximity of said pan; and
   control means for selectively activating and deactivating said vibrating means to selectively impart vibrations to the charcoal briquettes and remove ash thereon to control the level of heat emitted by the charcoal briquettes to substantially maintain said desired temperature
   wherein said control means includes responsive means for generating a signal when the temperature of the briquettes decreases below said desired temperature, said control means being arranged to activate said vibrating means only upon detection of said signal.

2. The device as defined in claim 1, wherein said responsive means includes a thermocouple responsive to the temperature of the briquettes.

3. The device as defined in claim 1, wherein said responsive means includes a wireless external controller.

4. The device as defined in claim 1, wherein said responsive means includes an optical sensor responsive to the temperature of the briquettes.

5. The device as defined in claim 1, wherein said responsive means includes an optical sensor responsive to at least one of the color and image of the briquettes.

6. The device as defined in claim 1, wherein said responsive means includes a timer.

7. The device as defined in claim 1, wherein said pan has a resonant frequency and said vibrating means is arranged to vibrate said pan at its resonant frequency to optimize vibrations of said pan and the briquettes to increase the efficiency of the removal of ash coating or covering on the briquettes.

8. The device as defined in claim 1, wherein said control means is programmed to vibrate said pan for a first interval of time followed by a second interval of time during which vibrations are interrupted.

9. The device as defined in claim 1, wherein said control means includes a user interface that allows a user to select said desired temperature.

10. A device for maintaining the temperature of charcoal briquettes in a BBQ substantially at a desired temperature comprising:
    a metal BBQ pan configured to receive and support charcoal briquettes to be burned to generate heat within said pan resulting in a coating of ash on the charcoal briquettes as combustion takes place, the level of heat generated by the briquettes being a function of the extent of coating of ash on the charcoal briquettes;
    vibrating means for vibrating said metal pan and the charcoal briquettes supported therein; and
    digital control means for selectively activating said vibrating means to selectively impart vibrations to the charcoal briquettes and selectively remove ash thereon to expose burning cores of the briquettes to ambient oxygen to thereby control the level of heat emitted by the charcoal briquettes by controlling the reaction rate between the briquettes and the ambient oxygen to substantially maintain said desired temperature
    wherein said control means includes responsive means for generating a signal when the temperature of the briquettes decreases below said desired temperature, said control means being arranged to activate said vibrating means only upon detection of said signal.

11. A device for maintaining the temperature of burning charcoal briquettes substantially at a desired temperature in a BBQ pan that generate heat within the pan resulting in a coating of ash on the charcoal briquettes as combustion takes place, the level of heat generated by the briquettes being a function of the extent of coating of ash on the charcoal briquettes, comprising:
    vibrating means for shaking the pan and thereby shaking or agitating the charcoal briquettes supported therein to remove ash accumulated on the briquettes due to combustion;
    responsive means for generating a signal when the temperature of the briquettes decreases below said desired temperature; and
    control means responsive to said signal for selectively activating said vibrating means upon detection of said signal to selectively impart vibrations to the charcoal briquettes and selectively remove ash thereon to control the level of heat emitted by the charcoal briquettes by controlling the reaction rate between the briquettes and ambient oxygen to increase and restore the temperature to substantially said desired temperature.

12. The device as defined in claim 11, wherein said responsive means includes a thermocouple responsive to the temperature of the briquettes.

13. The device as defined in claim 11, wherein said responsive means includes a wireless external controller.

14. The device as defined in claim 11, wherein said responsive means includes an optical sensor responsive to the temperature of the briquettes.

15. The device as defined in claim 11, wherein said responsive means includes an optical sensor responsive to at least one of the color and image of the briquettes.

16. The device as defined in claim 11, wherein said responsive means includes a timer.

17. The device as defined in claim 11, wherein the pan has a resonant frequency and said vibrating means is arranged to vibrate said pan at its resonant frequency to optimize vibrations of the briquettes and the efficiency of the removal of ash coating or covering the briquettes.

18. The device as defined in claim 11, wherein said control means is programmed to vibrate said pan for a first interval of time followed by a second interval of time during which vibrations are interrupted.

19. The device as defined in claim 11, wherein said control means includes a user interface that allows a user to select said desired temperature.

\* \* \* \* \*